(12) United States Patent
Okada

(10) Patent No.: US 8,654,417 B2
(45) Date of Patent: Feb. 18, 2014

(54) IMAGE READING APPARATUS AND PROGRAM

(75) Inventor: Hidekazu Okada, Hashima (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 118 days.

(21) Appl. No.: 13/308,034

(22) Filed: Nov. 30, 2011

(65) Prior Publication Data

US 2012/0133998 A1  May 31, 2012

(30) Foreign Application Priority Data

Nov. 30, 2010  (JP) ................................ 2010-265842

(51) Int. Cl.
*H04N 1/04* (2006.01)

(52) U.S. Cl.
USPC .......................... 358/498; 358/474; 358/513

(58) Field of Classification Search
USPC ......... 358/474, 498, 497, 496, 513, 514, 482, 358/483
See application file for complete search history.

(56) References Cited

U.S. PATENT DOCUMENTS

| | | | | |
|---|---|---|---|---|
| 4,457,506 A * | 7/1984 | Ashbee et al. | ............... | 271/3.01 |
| 5,328,163 A * | 7/1994 | Yamada | ...................... | 271/10.01 |
| 5,745,253 A * | 4/1998 | Muramatsu et al. | .......... | 358/408 |
| 5,796,928 A * | 8/1998 | Toyomura et al. | ............. | 358/1.6 |
| 6,565,079 B1 * | 5/2003 | Kakegawa et al. | ............ | 271/125 |
| 6,636,703 B2 * | 10/2003 | Deen et al. | ...................... | 399/17 |
| 7,425,001 B2 * | 9/2008 | Sano et al. | .................... | 271/242 |
| 7,557,968 B2 * | 7/2009 | Onodera | ........................ | 358/498 |
| 7,957,042 B2 * | 6/2011 | Onodera | ........................ | 358/498 |
| 8,144,375 B2 * | 3/2012 | Tanimoto et al. | ............. | 358/474 |
| 8,274,673 B2 * | 9/2012 | Okumura et al. | ............ | 358/1.13 |
| 8,314,974 B2 * | 11/2012 | Kweon | .......................... | 358/474 |
| 8,348,269 B2 * | 1/2013 | Oshima | .................... | 271/265.01 |
| 8,467,111 B2 * | 6/2013 | Kamio et al. | ................. | 358/475 |
| 8,477,387 B2 * | 7/2013 | Shiraishi | ....................... | 358/474 |

(Continued)

FOREIGN PATENT DOCUMENTS

| | | |
|---|---|---|
| JP | 2004-07-02 A | 7/2004 |
| JP | 2004-186807 A | 7/2004 |
| JP | 2005-005837 A | 1/2005 |
| JP | 2009-267781 A | 11/2009 |
| JP | 2011-030205 A | 2/2011 |

OTHER PUBLICATIONS

Japanese Office Action together with English language translation dated Jan. 29, 2013 issued in corresponding Japanese Patent Application No. 2010-265842.

*Primary Examiner* — Negussie Worku
(74) *Attorney, Agent, or Firm* — Scully, Scott, Murphy & Presser, P.C.

(57) ABSTRACT

An image reading apparatus includes: a transport unit; a first reading unit which reads one surface of a document transported by the transport unit and generates first read data of a front end portion or a rear end portion of the one surface of the document; a second reading unit which reads the other surface of the document transported by the transport unit and generates second read data of a front end portion or a rear end portion of the other surface of the document; an edge detection unit which performs edge detection processing on each of the first read data and the second read data; and a determination unit which determines that there is double feeding of documents by the transport unit when the edge detection unit detects a plurality of edges from at least either the first read data or the second read data.

8 Claims, 10 Drawing Sheets

(56) References Cited

U.S. PATENT DOCUMENTS

| | | | |
|---|---|---|---|
| 8,508,778 B2 * | 8/2013 | Tanimoto et al. | 358/1.15 |
| 8,514,466 B2 * | 8/2013 | Inukai | 358/474 |
| 8,537,432 B2 * | 9/2013 | Yokochi | 358/474 |
| 2009/0268258 A1 | 10/2009 | Yoshizawa | |
| 2010/0328734 A1 | 12/2010 | Okada | |

* cited by examiner

IMAGE READING APPARATUS AND PROGRAM

CROSS REFERENCE TO RELATED APPLICATION

The present application claims priority from Japanese Patent Application No. 2010-265842, which was filed on Nov. 30, 2010, the disclosure of which is herein incorporated by reference in its entirety.

TECHNICAL FIELD

The present invention relates to an image reading apparatus which reads an image of a document and more specifically, to an image reading apparatus capable of detecting double feeding of documents transported along the transport path.

BACKGROUND

In the related art, an auto document feeder (ADF) which transports documents automatically is provided in image reading apparatuses, such as a scanner, a copying machine, and a facsimile machine. In this ADF, documents are transported along the transport path from a paper feed tray toward a paper discharge tray by a transport mechanism. A reading device is disposed on the transport path to read an image of the document.

When documents are transported by the transport mechanism, a plurality of documents may be transported in an overlap state. That is, double feeding may occur. In order to detect double feeding of documents in the related art, for example, a double feed detection sensor using an ultrasonic wave is provided in the image reading apparatus. However, using such a dedicated sensor increases the cost of the image reading apparatus.

In addition, Patent Document 1 discloses an image reading apparatus in which such a dedicated sensor is not provided and which performs edge detection processing in an end portion of a document for the read document data and determines that documents are transported in an overlap state if the number of edges detected is 2 or more.
[Patent Document 1] JP-A-2005-5837

SUMMARY

In the known technique disclosed in Patent Document 1, however, there have been cases where double feeding cannot be determined since the edge detection processing is performed in only a part of the front and rear end portions of the document.

Therefore, it is an object of the invention to provide an image reading apparatus capable of detecting double feeding of documents accurately while suppressing the apparatus cost.

According to an aspect of the present invention, there is provided an image an image reading apparatus comprising: a transport unit which transports a document placed on a paper feed tray to a paper discharge tray along a transport path; a first reading unit which reads one surface of the document transported by the transport unit and generates first read data of a front end portion or a rear end portion of the one surface of the document; a second reading unit which reads the other surface of the document transported by the transport unit and generates second read data of a front end portion or a rear end portion of the other surface of the document; an edge detection unit which performs edge detection processing on each of the first read data and the second read data; and a determination unit which determines that there is double feeding of documents by the transport unit when the edge detection unit detects a plurality of edges from at least either the first read data or the second read data.

According to the invention described above, an image reading apparatus capable of detecting double feeding of documents accurately while suppressing the apparatus cost can be provided by using two existing reading units.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, image reading apparatuses according to first to fourth embodiments of the invention will be described with reference to the accompanying drawings.

First Embodiment

Entire Configuration of an Image Reading Apparatus

Figure 1:
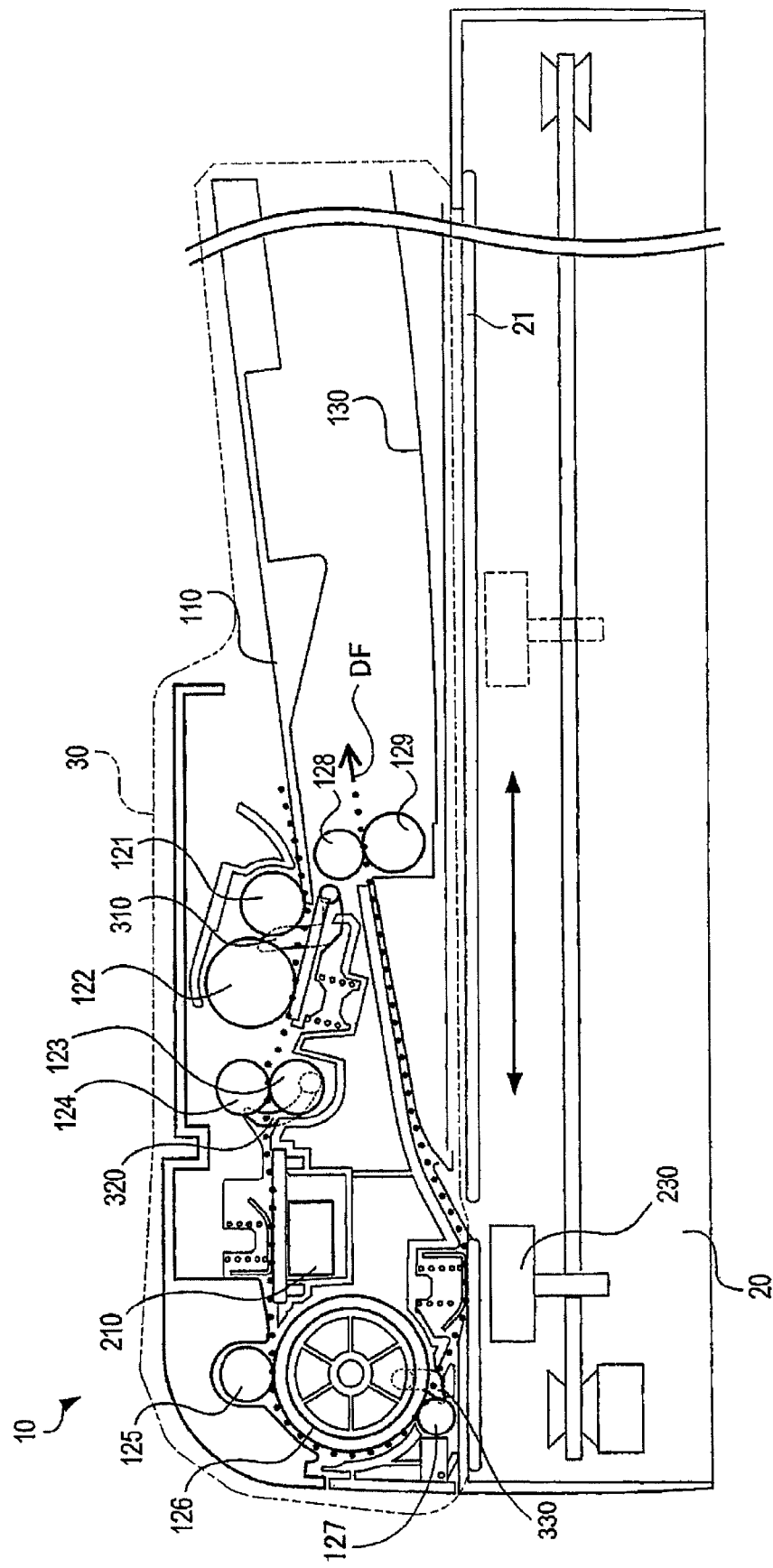
FIG. 1 is a sectional view showing the configuration of main parts of an image reading apparatus according to a first embodiment of the invention.

First, the entire configuration of the common image reading apparatus according to the first to fourth embodiments of the invention will be described with reference to FIG. 1. An image reading apparatus 10 is provided in an apparatus, such as a scanner, a copying machine, a facsimile machine or a complex machine having these functions. As shown in FIG. 1, the image reading apparatus 10 includes a base 20 and an auto document feeder (ADF) 30 which is shown by a dashed line. A transparent document platen 21 formed of glass is provided on the top surface of the base 20. When the image reading apparatus 10 is used as a flatbed scanner, a document is placed on the document platen 21.

The ADF 30 is fixed to one edge of the top surface of the base 20 so as to be freely opened and closed and so as to cover a document placed on the document platen 21 when located on the surface of the document platen 21. In addition, the ADF 30 discharges a document placed on a paper feed tray 110 to a paper discharge tray 130 along the transport path (shown by a dotted line in FIG. 1) using transport rollers 121 to 129.

Moreover, in subsequent explanation, when a document is placed on the paper feed tray 110, the surface of the document in the upper direction of the image reading apparatus 10 is assumed to be a top surface of the document and the surface of the document in the lower direction of the image reading apparatus 10 in FIG. 1 is assumed to be a back surface of the document.

An ADF side reading device 210 reads an image on the back surface of a transported document, that is, a back side image of the document in FIG. 1.

An FB (flatbed) side reading device 230 reads an image on the top surface of a document transported after being reversed by the transport roller 126, that is, a back side image of the reversed document in FIG. 1.

In addition, a CIS (Contact Image Sensor) or a CCD (Charge Coupled Device) is typically adopted as the ADF side reading device 210.

The image reading apparatus 10 with such a configuration can feed a plurality of documents, which are placed on the paper feed tray 110, one by one continuously.

The ADF side reading device 210 and the FB side reading device 230 are examples of a "first reading unit" and a "second reading unit" of the invention. In addition, image reading processings performed by the ADF side reading device 210 and the FE side reading device 230 are examples of a "first reading step" and a "second reading step".

Figure 2:
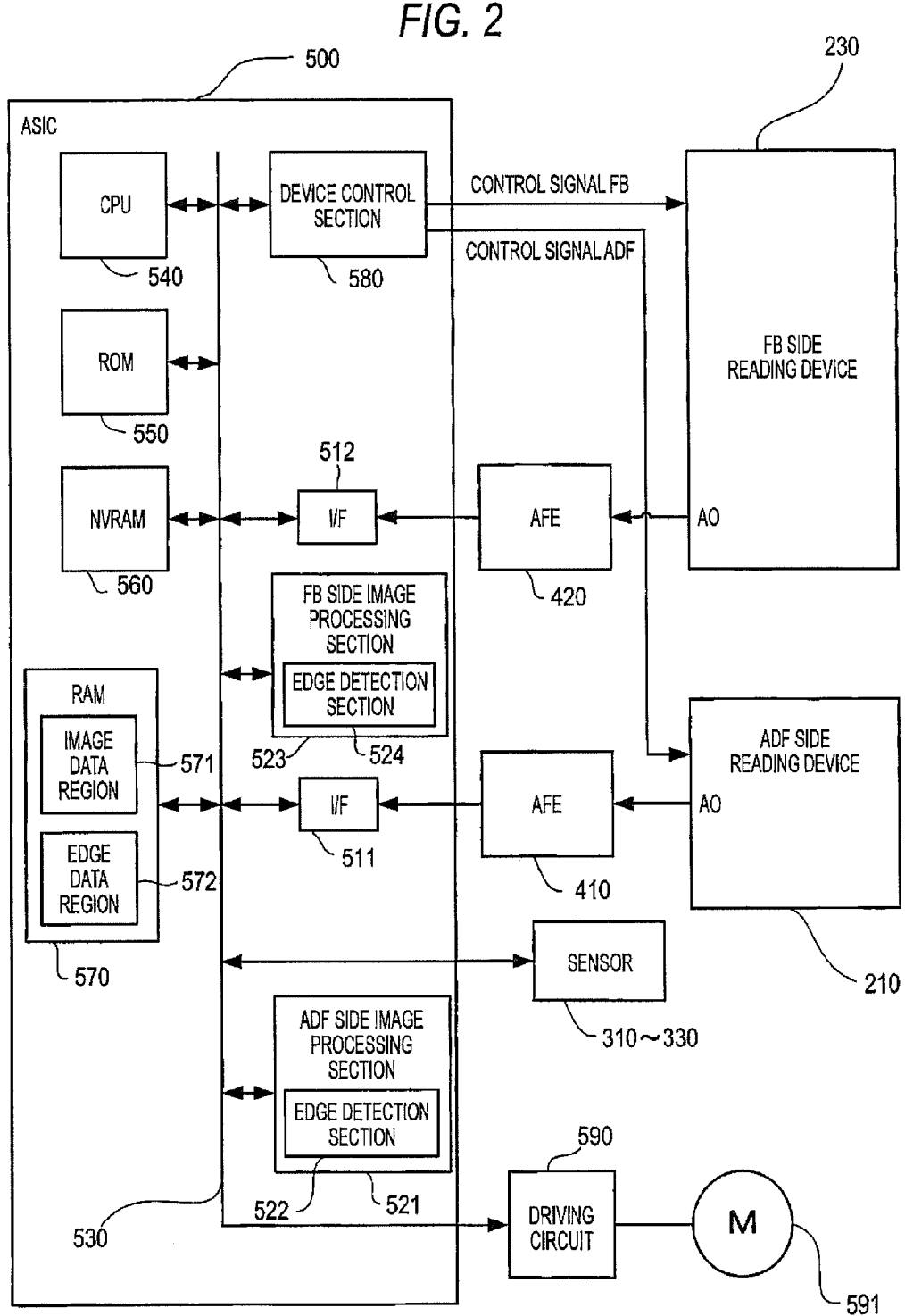
FIG. 2 is a block diagram showing the electric configuration of the image reading apparatus according to the first embodiment.

The transport rollers 121 to 129 are driven by a motor 591 (see FIG. 2). Sensors 310, 320, and 330 are sensors which detect the existence of a document at the arrangement position of each sensor in order to determine a timing of image reading by each reading device. In addition, the transport rollers 121 to 129 are examples of a "transport unit" of the invention.

As described above, two reading devices are disposed in the image reading apparatus 10. The ADF side reading device 210 is disposed at the upstream side of the transport path, and reads an image of the back surface of a document line by line when a document is transported and generates a back surface image analog signal for each line. The FB side reading device 230 is disposed at the downstream side of the ADF side reading device 210 in the transport path, and reads an image of the top surface of the document line by line and generates a top surface image analog signal for each line.

FIG. 2 is a block diagram showing the electrical configuration of the common image reading apparatus according to the first to fourth embodiments. As shown in FIG. 2, the image reading apparatus 10 includes the ADF side reading device 210, the FB side reading device 230, an analogue front end 410 for the ADF side reading device 210, an analogue front end 420 for the FB side reading device 230, an ASIC (Application Specific Integrated Circuit) 500, a driving circuit 590, the motor 591, and the sensors 310, 320, and 330.

The ASIC 500 controls the operation of the image reading apparatus 10. Specifically, control signals output from the ASIC 500 are input to the ADF side reading device 210, the FB side reading device 230, and the driving circuit 590. In response to the control signals, the ADF side reading device 210, the FB side reading device 230, and the motor 591 are driven.

The ADF side reading device 210 reads a back surface image of a transported document and generates a back surface image analog signal. The FB side reading device 230 reads a top surface image of the document and generates a top surface image analog signal. The motor 591 drives the transport rollers 121 to 129, and the transport rollers 121 to 129 transport a document.

Each of the analogue front ends 410 and 420 (hereinafter, the analogue front end is called an AFE) includes an analog-to-digital conversion circuit. The AFEs 410 and 420 convert the back surface image analog signal and the top surface image analog signal output from the ADF side reading device 210 and the FB side reading device 230 into image data, which is digital signals, respectively. Then, the converted back surface image data of the back surface and the converted top surface image data of the top surface are input to the ASIC 500.

As shown in FIG. 2, the ASIC 500 includes interfaces (I/F) 511 and 512, an ADF side image processing section 521, an FB side image processing section 523, a CPU (Central Processor Unit) 540, a ROM (Read Only Memory) 550, a non-volatile memory NVRAM (Non-Versatile RAM) 560, a memory (RAM) 570, and a device control section 580. In addition, the I/Fs 511, 512, the ADF side image processing section 521, the FB side image processing section 523, the CPU 540, the ROM 550, the NVRAM 560, the RAM 570, and the device control section 580 are connected to a bus 530. The image data of each line input from the AFEs 410 and 420 to the ASIC 500 is input to the RAM 570 through the I/Fs 511 and 512 and the bus 530 and is then stored in an image data region 571 of the RAM 570.

The ADF side image processing section 521 and the FB side image processing section 523 perform image processing on the back surface image data and the top surface image data output from the AFEs 410 and 420, respectively.

The ADF side image processing section 521 and the FB side image processing section 523 include an edge detection section 522 and an edge detection section 524, respectively. The edge detection sections 522 and 524 read the image data of each line from the image data region 571 of the RAM 570 and perform edge detection processing to detect an edge.

The CPU 540, the edge detection section 522, and the edge detection section 524 which perform edge detection according to steps S404, S414, S419, and S410, which will be described later, are an example of an "edge detection unit" of the invention. In addition, edge detection processing according to steps S404, S414, S419, and S410, which will be described later, is an example of an "edge detection step" of the invention.

For example, the edge detection sections 522 and 524 perform edge processing of the image data by performing edge enhancement processing and binarization processing on the image data and determining whether or not the processed image data is equal to or larger than the threshold value set in advance. Moreover, in the present embodiment, the method of detecting the edge by processing the image data is not limited to the method described above.

When the edge is detected from the image data by the edge detection sections 522 and 524, the edge data is stored in an edge data region 572 of the RAM 570 through the bus 530. The CPU 540 determines the existence of double feeding of documents on the basis of the edge data stored in the edge data region 572 of the RAM 570.

In addition, the CPU 540 which determines the existence of double feeding of documents is an example of a "determination unit" of the invention. In addition, in step S430 which will be described later, determination processing performed by the CPU 540 is an example of a "determination step" of the invention.

[Determination on Double Feeding Based on the Edge]

Next, determining the existence of double feeding of documents from the edge detected by the edge detection sections 522 and 524 will be described using FIGS. 3A to 3D and 4A to 4D and Table 1.

FIGS. 3A to 3D show respective situations where two documents G1 and G2 are transported along a transport direction DF of documents indicated by the arrow in an overlap state. In addition, FIGS. 4A to 4D show the image data after edge enhancement processing and binarization processing are performed by the edge detection sections 522 and 524 in the respective situations corresponding to FIGS. 3A to 3D.

Figure 3A:
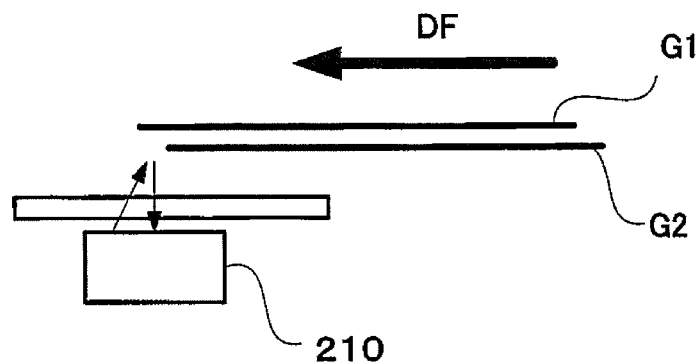
FIG. 3A is a view showing a situation where the front end of a document G1, of two documents G1 and G2 transported in an overlap state, protrudes from the front end of a document G2 in the transport direction DF when an ADF side reading device reads the front ends of back surfaces of the documents.

FIG. 3A shows a situation where the ADF side reading device 210 reads a front end region of the back surface of a document. In addition, in FIG. 3A, the front end of the document G1 of the two documents G1 and G2 transported in an overlap state protrudes from the front end of the document G2 in the transport direction DF.

The ADF side reading device 210 emits light toward the back surfaces of the transported documents and reads back surface images of the documents from the light reflected from the back surfaces of the documents.

Figure 4A:
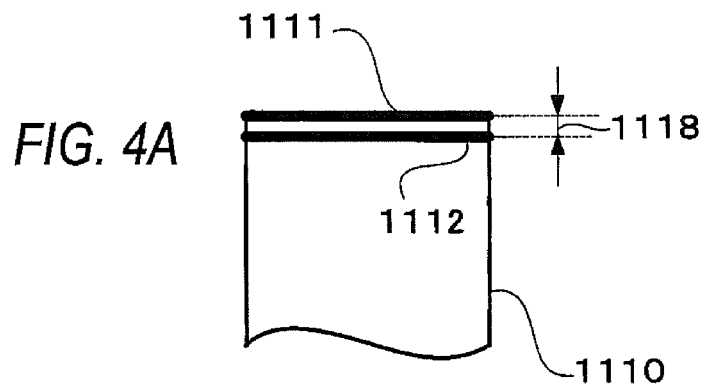
FIG. 4A is a view showing image data 1110 at the front end of the back surface after edge enhancement processing and binarization processing are performed by an edge detection section 522 in the situation shown in FIG. 3A.

In the case shown in FIG. 3A, light emitted from the ADF side reading device 210 cannot reach both the front end of the back surface of the document G1 and the front end of the back surface of the document G2. FIG. 4A shows image data 1110 at the front end of the back surface after edge enhancement processing and binarization processing are performed by the edge detection section 522 in the situation shown in FIG. 3A. Then, the edge detection section 522 detects edge data 1111 as a front end of the back surface of the document G1 and detects edge data 1112 as a front end of the back surface of the document G2, and the edge data 1111 and 1112 is stored in the edge data region 572. Therefore, the CPU 540 can perform determination as double feeding since there are a plurality of edge data items in the edge data region 572 of the RAM 570.

Figure 3B:
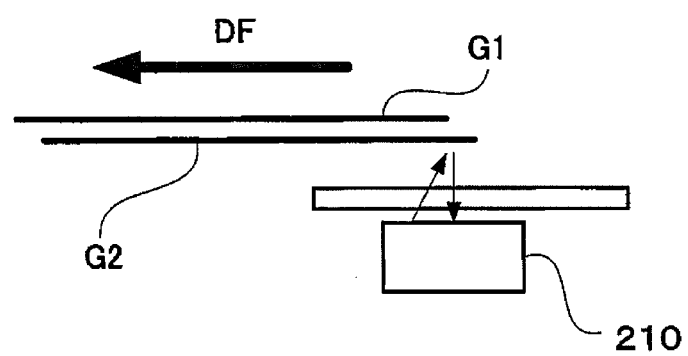
FIG. 3B is a view showing a situation where the rear end of the document G2, of the two documents G1 and G2 transported in an overlap state, protrudes from the rear end of the document G1 in the opposite direction of the transport direction DF when the ADF side reading device reads the rear ends of the back surfaces of the documents.
Figure 4B:
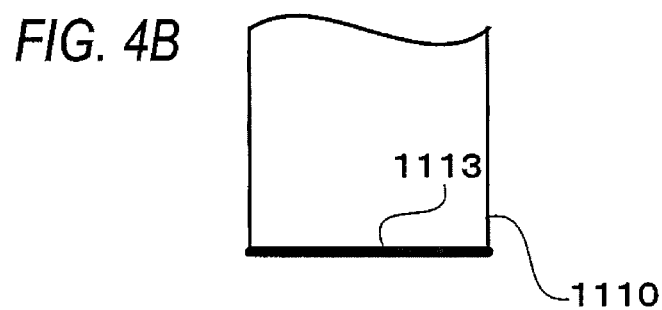
FIG. 4B is a view showing image data 1110 at the rear end of the back surface after edge enhancement processing and binarization processing are performed by the edge detection section 522 in the situation shown in FIG. 3B.

When the documents are transported by the transport rollers 121 to 129 from the situation shown in FIG. 3A, rear ends of the back surfaces of the documents arrive at the position of the ADF side reading device 210. That is, FIG. 3B shows a situation where the rear end of the document G2, of the two documents G1 and G2 transported in an overlap state, protrudes from the rear end of the document G1 in the opposite direction of the transport direction DF when the ADF side reading device 210 reads rear end regions of the back surfaces of the documents. In addition, FIG. 4B shows the image data 1110 at the front end of the back surface after edge enhancement processing and binarization processing are performed by the edge detection section 522 in the situation shown in FIG. 3B.

In the situation shown in FIG. 3B, the document G1 is shielded by the document G2. Accordingly, light emitted from the ADF side reading device 210 can reach the rear end of the back surface of the document G2 but cannot reach the rear end of the back surface of the document G1. Then, the edge detection section 522 detects only the rear end of the document G2 as edge data 1113. For this reason, the CPU 540 cannot perform determination as double feeding even if the documents are transported in an overlap state.

Figure 3C:
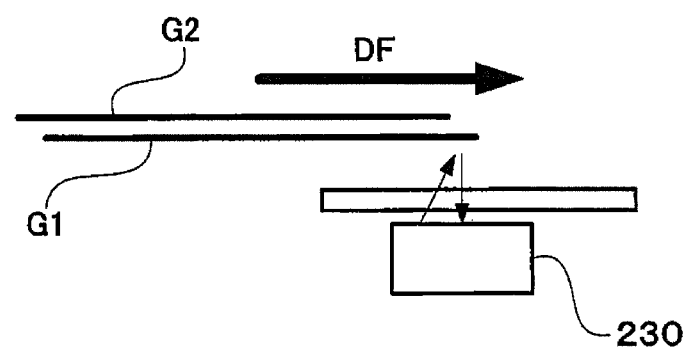
FIG. 3C is a view showing a situation where the front end of the document G1, of the two documents G1 and G2 transported in an overlap state, protrudes from the front end of the document G2 in the transport direction DF when an FB side reading device reads the front ends of top surfaces of the documents.

FIG. 3C shows a situation where the front end of the document G1, of the two documents G1 and G2 transported in an overlap state, protrudes from the front end of the document G2 in the transport direction DF when the FB side reading device 230 reads front end regions of the top surfaces of the documents.

Figure 4C:
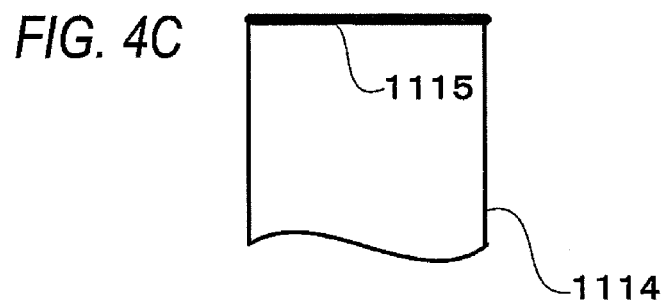
FIG. 4C is a view showing image data 1114 at the front end of the top surface after edge enhancement processing and binarization processing are performed by an edge detection section 524 in the situation shown in FIG. 3C.

In addition, FIG. 4C shows image data 1114 at the front end of the top surface after edge enhancement processing and binarization processing are performed by the edge detection section 524 in the situation shown in FIG. 3C.

In the situation shown in FIG. 3C, the document G2 is shielded by the document G1. Accordingly, light emitted from the FB side reading device 230 can reach the front end of the top surface of the document G1 but cannot reach the front end of the top surface of the document G2. Then, the edge detection section 524 detects only the front end of the document G1 as edge data 1115. For this reason, the CPU 540 cannot perform determination as double feeding even if the documents are transported in an overlap state.

Figure 3D:
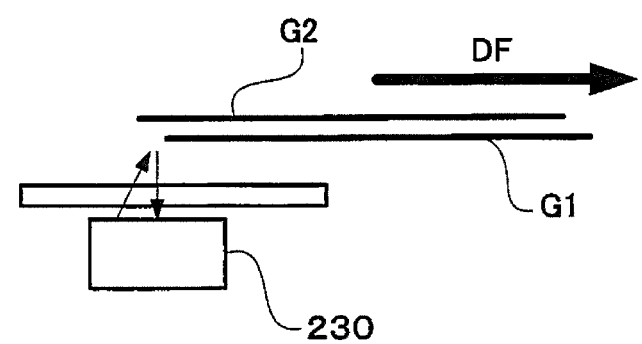
FIG. 3D is a view showing a situation where the rear end of the document G2, of the two documents G1 and G2 transported in an overlap state, protrudes from the rear end of the document G1 in the opposite direction of the transport direction DF when the FB side reading device reads the rear ends of the top surfaces of the documents.
Figure 4D:
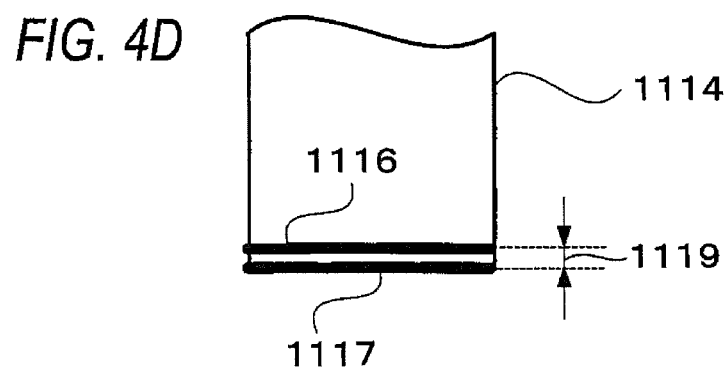
FIG. 4D is a view showing image data 1114 at the rear end of the top surface after edge enhancement processing and binarization processing are performed by the edge detection section 524 in the situation shown in FIG. 3D.

FIG. 3D shows a situation where the rear end of the document G2, of the two documents G1 and G2 transported in an overlap state, protrudes from the rear end of the document G1 in the opposite direction of the transport direction DF when the FB side reading device 230 reads rear ends of the top surfaces of the documents. In addition, FIG. 4D shows the image data 1114 at the rear end of the top surface after edge enhancement processing and binarization processing are performed by the edge detection section 524 in the situation shown in FIG. 3D.

In the case shown in FIG. 3D, light emitted from the FB side reading device 230 can reach both the rear end of the top surface of the document G1 and the rear end of the top surface of the document G2. Then, the edge detection section 524 can detect the rear end of the document G1 and the rear end of the document G2 as edge data 1116 and the edge data 1117, respectively.

Therefore, since there are a plurality of edge data items in the edge data region 572 of the RAM 570, the CPU 540 can perform determination as double feeding.

TABLE 1

|  |  | top surface front_rear end_end back surface | top surface front_rear end_end back surface |
|---|---|---|---|
| ADF side reading device 210 | front end | O | X |
|  | rear end | X | O |
| FB side reading device 230 | front end | X | O |
|  | rear end | O | X |

Table 1 summarizes whether or not the edge detection sections 522 and 524 can detect a plurality of edges from the image data, which is read by the ADF side reading device 210 and the FB side reading device 230, according to the overlap state of two kinds of documents G1 and G2.

The left side in Table 1 shows a case where the documents placed on the paper feed tray 110 are transported by the transport rollers 121 and 121 in an overlap state such that the upper document protrudes from the lower document. In addition, the right side in Table 1 shows a case where documents placed on the paper feed tray 110 are transported in an overlap state such that the lower document protrudes from the upper document.

In addition, the left side in Table 1 corresponds to FIGS. 3A to 3D in order from above. At the left side in Table 1 corresponding to FIGS. 3A to 3D, the "front end" of the ADF side reading device 210 indicates the situation of FIG. 3A, and the corresponding O mark in Table 1 means that the edge detection section 522 detects two edges.

In addition, the "rear end" of the ADF side reading device 210 at the left side in Table 1 indicates the situation of FIG. 3B, and the corresponding X mark in Table 1 means that the edge detection section 522 cannot detect two edges.

Similarly, the "rear end" of the FB side reading device 230 at the left side in Table 1 indicates the situation of FIG. 3C, and the "rear end" of the FB side reading device 230 at the left side in Table 1 indicates the situation of FIG. 3D. The case where the edge detection section 524 can detect two edges is indicated by the O mark, and the case where the edge detection section 524 cannot detect two edges is indicated by the X mark.

The right side in Table 1 shows a case where documents are transported in an overlap state such that the lower document protrudes from the upper document, unlike the left side in Table 1. The front end of the ADF side reading device 210 at the right side in Table 1 is shown by the X mark, and this indicates that the edge detection section 522 cannot detect two edges.

Hereinafter, double feeding detection processing in the first to fourth embodiments will be described in detail on the basis of FIGS. 3A to 3D and 4A to 4D and Table 1.

Double Feeding Detection Processing in the First Embodiment

Next, double feeding detection processing when the image reading apparatus 10 related to the first embodiment reads documents of both the surfaces will be described in detail with reference to FIG. 5. In addition, each step described in the following flow chart related to the first to fourth embodiments is processing executed by the CPU 540. In addition, the flow chart is stored as a control program in the ROM 550. S in the drawings indicates a step hereinbelow.

In addition, in the first to fourth embodiments, a region from the front end or the rear end of each of the front and back surfaces of a document to a predetermined position of the document, which is away from the front end or the rear end by a predetermined distance, is assumed to be a region for edge detection processing. For convenience of explanation, it is assumed that a region from the front end of a document to a predetermined position in the transport direction DF is a "front end portion" of the document and a region from a predetermined position to the rear end of the document is a "rear end portion" of the document. In addition, a predetermined position specifying a front end portion of the back surface of a document, a predetermined position specifying a front end portion of the top surface of the document, a predetermined position specifying a rear end portion of the back surface of the document, and a predetermined position specifying a rear end portion of the top surface of the document are called a "first predetermined position", a "second predetermined position", a "third predetermined position", and a "fourth predetermined position", respectively. In addition, in the region for which the edge detection processing in the first to fourth embodiments is to be performed, the first to fourth predetermined positions are set such that a sufficient number of read lines for performing double feeding detection processing are included.

Returning to the explanation regarding the first embodiment, a plurality of double-sided documents are placed on the paper feed tray 110. In step S401 of FIG. 5, for example, when a user presses a read start switch (not shown), the following document reading processing of the flow chart in FIG. 5 is started.

In step S402, when a document is detected by the sensor 310, an operation signal is transmitted to the driving circuit 590. The driving circuit 590 rotates the motor 591 and the transport rollers 121 to 129 are driven by the motor 591. Then, transport of a document along the transport direction DF is started.

In step S403, when the front end of a document arrives at the position of the ADF side reading device 210, a control signal ADF is transmitted to the ADF side reading device 210. Then, the ADF side reading device 210 starts reading of the back surface of the document.

Then, after the sensor 320 detects the front end of the document, the CPU 540 determines whether or not the front end of the document has arrived at the position of the ADF side reading device 210 from a time taken for the front end of the document to arrive at the position of the ADF side reading device 210. Moreover, in subsequent processing, whether or not the front end or the rear end of the document or each of the predetermined positions (first to fourth predetermined positions) of the document has arrived at the position of the ADF side reading device 210 or the FB side reading device 230 is determined from a predetermined time taken to reach the position of each reading device after the front end or the rear end is detected by the sensor 320 or 330.

In step S404, an instruction to perform edge detection is given to the edge detection section 522.

Then, the edge detection section 522 reads the image data of one line from the image data region 571 and performs the above-described edge detection processing. If the edge is detected, the edge data is stored in a region for back surface front ends of the edge data region 572 of the RAM 570.

In step S405, it is determined whether or not data of a plurality of edges is stored in the region for back surface front ends of the edge data region 572. If there is no data of a plurality of edges (step S405: NO), the process proceeds to step S407. If there is data of a plurality of edges (step S405: YES), the process proceeds to step S430. Since a plurality of edges are detected in a front end portion of the back surface of a document, the CPU 540 performs determination as double feeding in step S430.

In step S432, the reading processing ends. The CPU 540 transmits a stop signal to the driving circuit 590, and the driving circuit 590 stops the operation of the motor 591. Accordingly, transport of a document is stopped. As a result, a document reading operation ends part way.

In step S407, it is determined whether or not the first predetermined position specifying the front end portion of the back surface of the document has arrived at the position of the ADF side reading device 210.

If the first predetermined position has not arrived (step S407: NO), the process returns to step S404. Thus, steps S404, S405, and S407 are repeated. The edge detection section 522 performs edge detection processing on the front end portion of the back surface of the document (region from the front end of the back surface of the document to the first predetermined position of the back surface of the document).

On the other hand, when it is determined that the first predetermined position has arrived at the position of the ADF side reading device 210 (step S407: YES), a plurality of edges are not detected in the front end portion of the back surface of the document and document reading continues, and the process proceeds to step S408.

In step S408, when the front end of the document arrives at the position of the FB side reading device 230, a control signal FB is transmitted to the FB side reading device 230. Then, the FB side reading device 230 starts reading of the top surface of the document.

In step S414, an instruction to perform edge detection is given to the edge detection section 524.

Then, the edge detection section 524 reads the image data of one line from the image data region 571 and performs edge detection processing. If the edge is detected, the edge data is stored in a region for top surface front ends of the edge data region 572 of the RAM 570.

In step S415, it is determined whether or not data of a plurality of edges is stored in the region for top surface front ends of the edge data region 572. If there is no data of a plurality of edges (step S415: NO), the process proceeds to step S417. If there is data of a plurality of edges (step S415: YES), the process proceeds to step S430.

In step S417, it is determined whether or not the second predetermined position specifying the front end portion of the top surface of the document has arrived at the position of the FB side reading device 230. If the second predetermined position has not arrived (step S417: NO), the process returns to step S414. Thus, steps S414, S415, and S417 are repeated. The edge detection section 522 performs edge detection processing on the front end portion of the top surface of the document (region from the front end of the top surface of the document to the second predetermined position of the top surface of the document).

On the other hand, when it is determined that the second predetermined position has arrived at the position of the FB side reading device 230 (step S417: YES), a plurality of edges are not detected in the front end portion of the top surface of the document and document reading continues, and the process proceeds to step S419.

In step S419, when it is determined that the third predetermined position specifying the rear end portion of the back surface of the document has arrived at the position of the ADF side reading device 210, an instruction to perform edge detection is given to the edge detection section 522. Then, the edge detection section 522 reads the image data of one line from the image data region 571 and performs edge detection processing. If the edge is detected, the edge data is stored in a region for back surface rear ends of the edge data region 572 of the RAM 570.

In step S420, it is determined whether or not data of a plurality of edges is stored in the region for back surface rear ends of the edge data region 572. If there is no data of a plurality of edges (step S420: NO), the process proceeds to step S421. If there is data of a plurality of edges (step S420: YES), the process proceeds to step S430.

In step S421, it is determined whether or not the rear end of the document has arrived at the position of the ADF side reading device 210. If the rear end of the document has not arrived (step S421: NO), the process returns to step S419. Thus, steps S419, S420, and S421 are repeated. Accordingly, the edge detection section 522 performs edge detection processing on the rear end portion of the back surface of the document (region from the third predetermined position of the back surface of the document to the rear end of the back surface of the document).

On the other hand, when it is determined that the rear end of the back surface of the document has arrived at the position of the ADF side reading device 210 (step S421: YES), reading of the ADF side reading device 210 which starts from step S403 ends, and the process proceeds to step S410.

In step S410, an instruction to perform edge detection is given to the edge detection section 524 after the fourth predetermined position specifying the rear end portion of the top surface of the document arrives at the position of the FB side reading device 230. Then, the edge detection section 524 reads the image data of one line from the image data region 571 and performs edge detection processing to detect an edge of the rear end portion of the top surface of the document. If the edge is detected, the edge data is stored in a region for top surface rear ends of the edge data region 572 of the RAM 570.

In step S411, it is determined whether or not data of a plurality of edges is stored in the region for top surface rear ends of the edge data region 572. If there is no data of a plurality of edges (step S411: NO), the process proceeds to step S412. If there is data of a plurality of edges (step S411: YES), the process proceeds to step S430.

In step S412, it is determined whether or not the rear end of the top surface of the document has arrived at the position of the FB side reading device 230. If the rear end of the top surface has not arrived (step S412: NO), the process returns to step S410. Thus, steps S410, S411, and S412 are repeated. Accordingly, the edge detection section 522 performs edge detection processing on the rear end portion of the top surface of the document (region from the fourth predetermined position to the rear end of the top surface of the document). On the other hand, when it is determined that the rear end of the top surface of the document has arrived at the position of the FB side reading device 230 (step S412: YES), the process proceeds to step S431.

In step S431, since the rear end of the top surface of the document has arrived at the position of the FB side reading device 230 and the entire top surface of the document and the entire back surface of the document have been read, the CPU 540 performs processing of completing the reading of the document. Then, the document is transported up to the paper discharge tray 130.

According to the present embodiment, when a plurality of edges are detected in any one place of the front end portion of the back surface of a document, the rear end portion of the back surface of the document, the front end portion of the top surface of the document, and the rear end portion of the top surface of the document, determination as double feeding is made using the known ADF side reading device 210 and the known FB side reading device 230 in a complex machine. Therefore, since the image reading apparatus according to the present embodiment can perform determination of double feeding in both the case of double feeding as at the left side in Table 1 and the case of double feeding as at the right side in Table 1, double feeding can be correctly determined. In addition, an image of an end portion of a read document is used for edge detection while reading the entire images of the back surface and the top surface of the document using the known ADF side reading device 210 and the known FB side reading device 230 in a complex machine. Accordingly, a cost increase can be suppressed without increasing the number of additional components, such as a double feed detection sensor.

Second Embodiment

An image reading apparatus according to a second embodiment has the same hardware configuration as the image reading apparatus shown in FIGS. 1 and 2.

Usually, as shown in FIGS. 4A to 4D, when the reading devices 210 and 230 read the front end or rear end of a document, image data of a portion of the end of the read document is highlighted by edge enhancement processing of the edge detection sections 522 and 524 to become edge data.

However, the following problems have often occurred when a long line is drawn across a document. When the edge detection sections 522 and 524 perform edge enhancement processing on the image data of the read long line and the image data of the long line after the edge enhancement processing exceeds a threshold value, the image data of the long line after the edge enhancement processing is stored as edge data in the edge data region 572.

Then, when one edge, which is actually a long line across the document, of a plurality of edges is considered as an edge, there is a possibility that the CPU 540 will perform erroneous determination of double feeding if the double feeding is determined on the basis of only the fact that there is a plurality of edge data items in the edge data region 572.

As summarized at the left side in Table 1, the case where documents are transported in an overlap state such that the upper document protrudes from the lower document will be considered. In this case, if the edge detection section 522 can detect a plurality of edges by the image data of the front end portion read by the ADF side reading device 210, the edge detection section 524 can also detect a plurality of edges by the image data of the rear end portion read by the FB side reading device 230.

On the other hand, as summarized at the right side in Table 1, the case where documents are transported in an overlap state such that the lower document protrudes from the upper document will be considered. In this case, if the edge detection section 524 can detect a plurality of edges by the image data of the rear end portion read by the ADF side reading device 210, it is also possible to detect a plurality of edges by the image data of the front end portion read by the FB side reading device 230.

Therefore, the image reading apparatus according to the second embodiment performs determination as double feeding when a plurality of edges are detected in each of two end portions located at the opposite sides of the top surface of a document and the back surface of a document.

Hereinafter, the second embodiment will be described using the flow chart shown in FIG. 6. Moreover, in FIG. 6, the same steps as in the flowchart shown in FIG. 5 are denoted by the same reference numerals, and repeated explanation thereof will be omitted.

Processing of steps S404 to S407 is a series of processing in which the CPU 540 determines whether or not the edge detection section 522 has detected a plurality of edges from the image data of a front end portion of the back surface of a document read by the ADF side reading device 210. The second embodiment is different from the first embodiment in that the CPU 540 does not perform determination as double feeding of documents even if a plurality of edges are detected in step S405. In step S406, the CPU 540 updates a flag 1 stored in the RAM 570 to "ON".

In step S409, it is determined whether or not the value of the flag 1 stored in the RAM 570 is "ON". That is, the CPU 540 determines whether or not a plurality of edges have been detected in the front end portion of the back surface of the document. If the value of the flag 1 is "ON" in step S409, the process proceeds to step S410 since a plurality of edges are detected in the front end portion of the back surface of the document.

Hereinafter, processing from step S410 will be described.

Processing of steps S410 to S412 is a series of processing in which the CPU 540 determines whether or not the edge detection section 524 has detected a plurality of edges from the image data of a rear end portion of the top surface of the document read by the FB side reading device 230.

In step S411, it is determined whether or not data of a plurality of edges is stored in the region for top surface rear ends of the edge data region 572. If there is no data of a plurality of edges (step S411: NO), the process proceeds to step S412. If there is data of a plurality of edges (step S411: YES), the process proceeds to step S413.

In step S413, since a plurality of edges are detected in both the front end portion of the back surface of the document and the rear end portion of the top surface of the document, determination as double feeding is made. In step S432, a document reading operation ends part way.

In addition, in the second embodiment, the CPU 540 which performs determination processing according to step S413 and steps S424, S422, S426, and S428, which will be described later, is an example of a "determination unit" of the invention, and the determination processing performed by the CPU 540 is an example of a "determination step" of the invention.

In step S424, since a plurality of edges are detected in the front end portion of the back surface of the document but a plurality of edges are not detected in the rear end portion of the top surface of the document, determination as no double feeding is made. Then, the process proceeds to step 431. In step S431, the reading of the document is completed.

If the value of the flag 1 is not "ON" (step S409: NO), the process proceeds to step S414. Processing of steps S414 to S417 is a series of processing in which the CPU 540 determines whether or not the edge detection section 524 has detected a plurality of edges from the image data of a front end portion of the top surface of the document read by the FB side reading device 230.

In step S415, it is determined whether or not data of a plurality of edges is stored in the region for top surface front ends of the edge data region 572. If there is no data of a plurality of edges (step S415: NO), the process proceeds to step S417. If there is data of a plurality of edges (step S415: YES), the CPU 540 sets a flag 2 stored in the RAM 570 to "ON" in step S416, and the process proceeds to step S418.

In step S418, it is determined whether or not the value of the flag 2 stored in the RAM 570 is "ON". That is, the CPU 540 determines whether or not a plurality of edges have been detected in the front end portion of the top surface of the document. When a plurality of edges are detected in the front end portion of the top surface of the document (step S418: YES), the process proceeds to step S419.

On the other hand, when a plurality of edges have not been detected in the front end portion of the top surface of the document (step S418: NO), determination as no double feeding is made in step S428 since a plurality of edges have not been detected either in the front end portion of the back surface of the document. In step S434, the ADF side reading device 210, the FB side reading device 230, and the like are controlled such that reading of the document continues until the reading of the entire back surface and the entire top surface of the document is completed.

Processing of steps S419 to S421 is a series of processing in which the CPU 540 determines whether or not the edge detection section 522 has detected a plurality of edges from the image data of a rear end portion of the back surface of the document read by the ADF side reading device 210.

In step S420, it is determined whether or not data of a plurality of edges is stored in the region for back surface rear ends of the edge data region 572. If there is no data of a plurality of edges (step S420: NO), the process proceeds to step S421. If there is data of a plurality of edges (step S420: YES), the process proceeds to step S422.

When it is determined that the rear end of the back surface of the document has arrived at the position of the ADF side reading device 210 (step S421: YES), determination as no double feeding is made in step S426. The process proceeds to step S434.

If there is data of a plurality of edges (step S420: YES), this means that a plurality of edges have been detected in both the rear end portion of the back surface of the document and the front end portion of the top surface of the document. Therefore, in step S422, determination as double feeding is made. In step S432, a document reading operation ends part way.

According to the present embodiment, edge detection is performed in two places of one end portion of the back surface of a document and the other end portion at the opposite side of the top surface of the document using the known ADF side reading device 210 and the known FB side reading device 230 in a complex machine, and determination as double feeding is made if a plurality of edges are detected in both places.

Accordingly, even if the edge detection sections 522 and 524 detect a long line across a document as an edge, double feeding can be correctly determined.

In addition, even if documents are transported in an overlap state, the edge detection section can neither detect a plurality of edges in a front end portion of the back surface of the document nor detect a plurality of edges in a rear end portion of the top surface of the document when the documents overlap each other as shown at the right side in Table 1. For this reason, in the present embodiment, a plurality of edges are detected in a front end portion of the back surface of a document and a rear end portion of the top surface of a document, and a plurality of edges are detected in a front end portion of the top surface of the document and a rear end portion of the back surface of the document if a plurality of edges cannot be detected in the front end portion of the back surface of the document and the rear end portion of the top surface of the document. As a result, in the present embodiment, the determination section can determine double feeding of documents correctly regardless of the overlap state of documents.

Third Embodiment

An image reading apparatus according to a third embodiment has the same hardware configuration as the image reading apparatus shown in FIGS. 1 and 2. However, in the third embodiment, two edges are detected in each of two end portions located at the opposite sides of the top surface of a document and the back surface of a document, a distance between the two edges is calculated, and the edge-to-edge distance between the two edges is used for determination of double feeding.

An edge-to-edge distance 1118 which is a distance between edge data 1111 and edge data 1112 is shown in FIG. 4A, and an edge-to-edge distance 1119 which is a distance between edge data 1116 and edge data 1117 is shown in FIG. 4D.

When documents are transported in the situation shown in FIG. 3A, the amount of deviation of the document G1 in the transport direction DF and the amount of deviation of the document G2 in the transport direction DF are also the same in the situation shown in FIG. 3D. Accordingly, the edge-to-edge distance 1118 and the edge-to-edge distance 1119 are equal.

Therefore, the image reading apparatus according to the third embodiment uses the edge-to-edge distance for determination of double feeding on the basis of the fact that the edge-to-edge distances in two end portions located at the opposite sides of the top surface of a document and the back surface of a document are equal when documents are transported in an overlap state.

Figure 5:
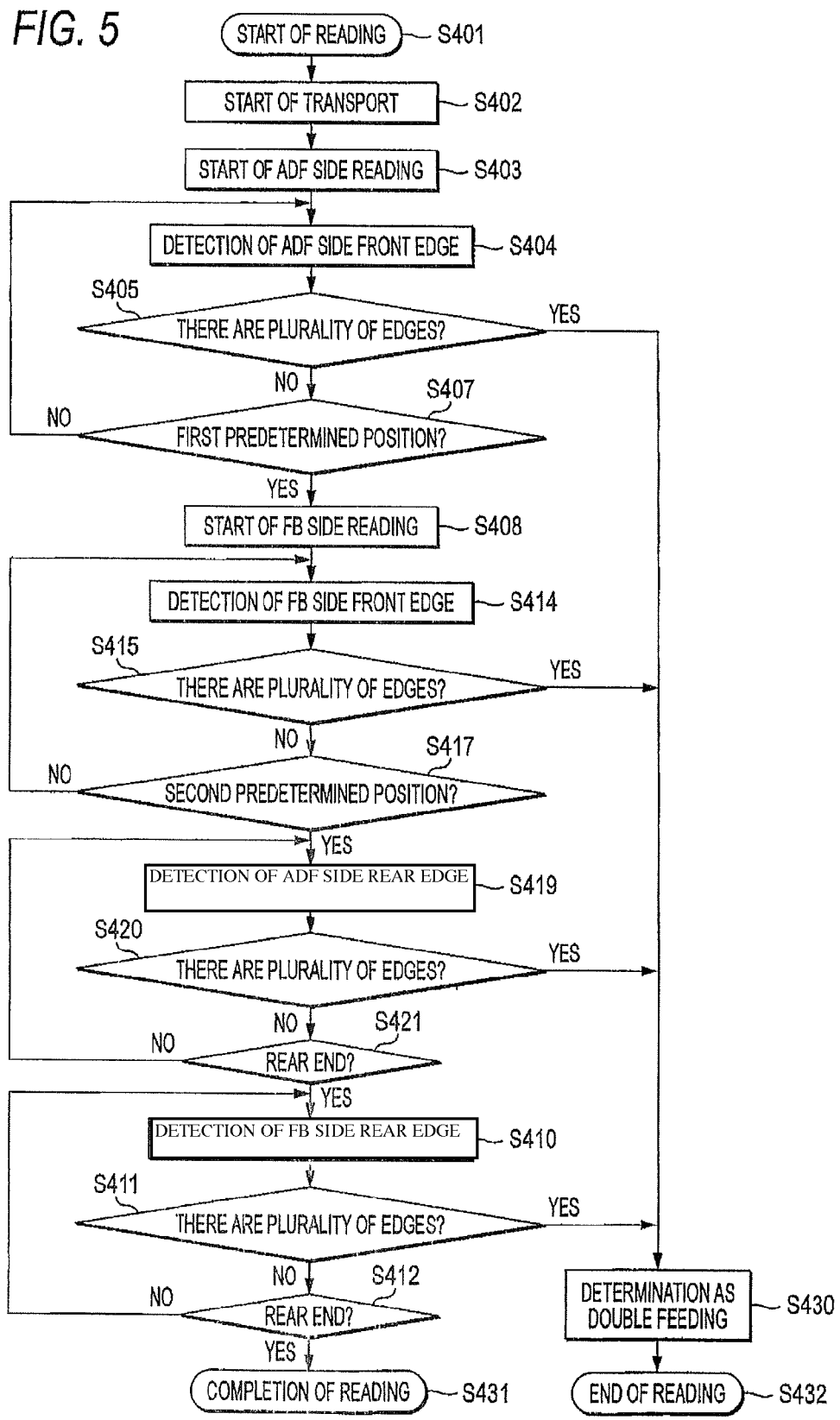
FIG. 5 is a flow chart showing processing of detecting double feeding of document in the image reading apparatus according to the first embodiment of the invention.
Figure 6:
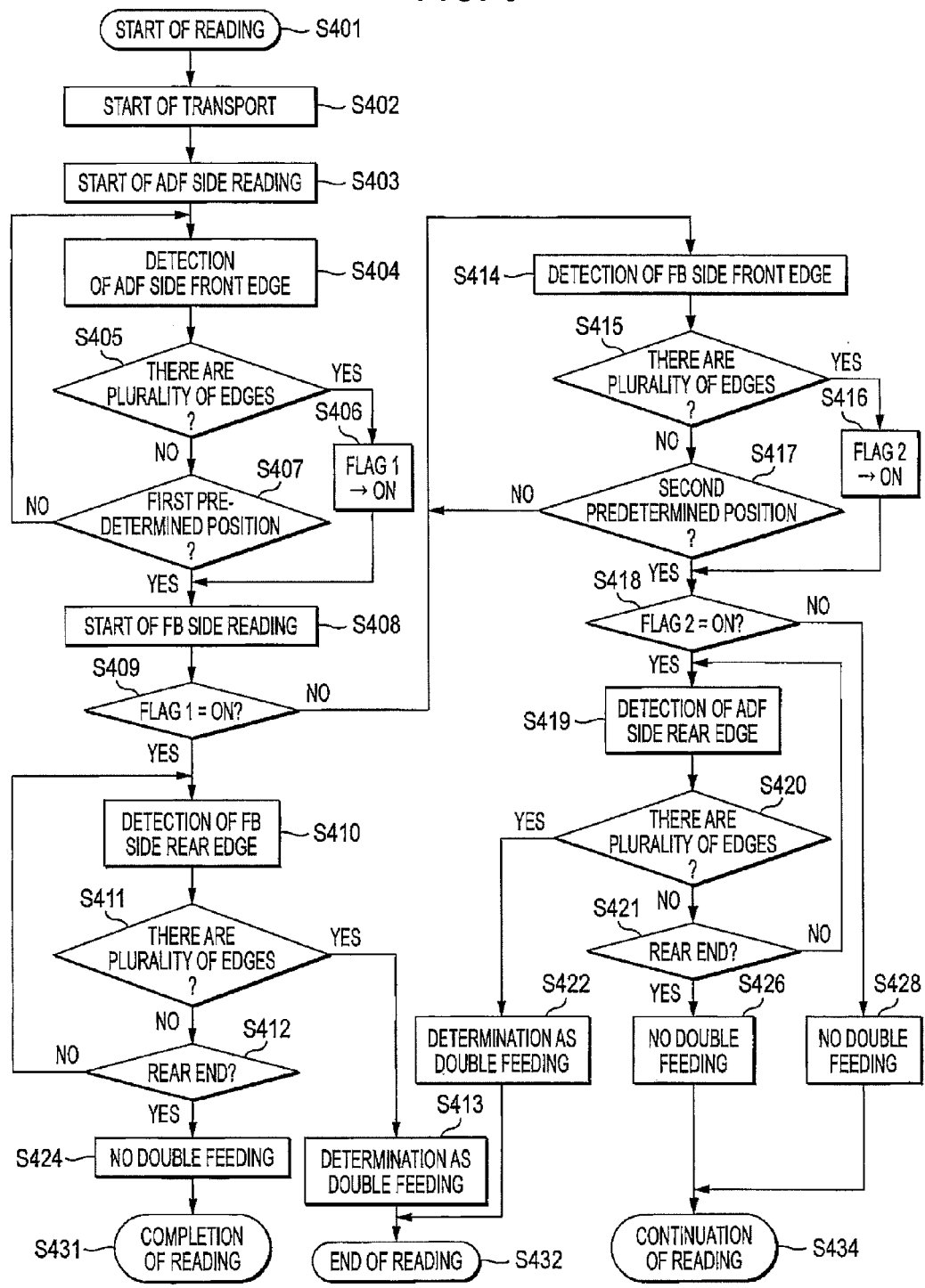
FIG. 6 is a flow chart showing processing of detecting double feeding of document in an image reading apparatus according to a second embodiment of the invention.
Figure 7:
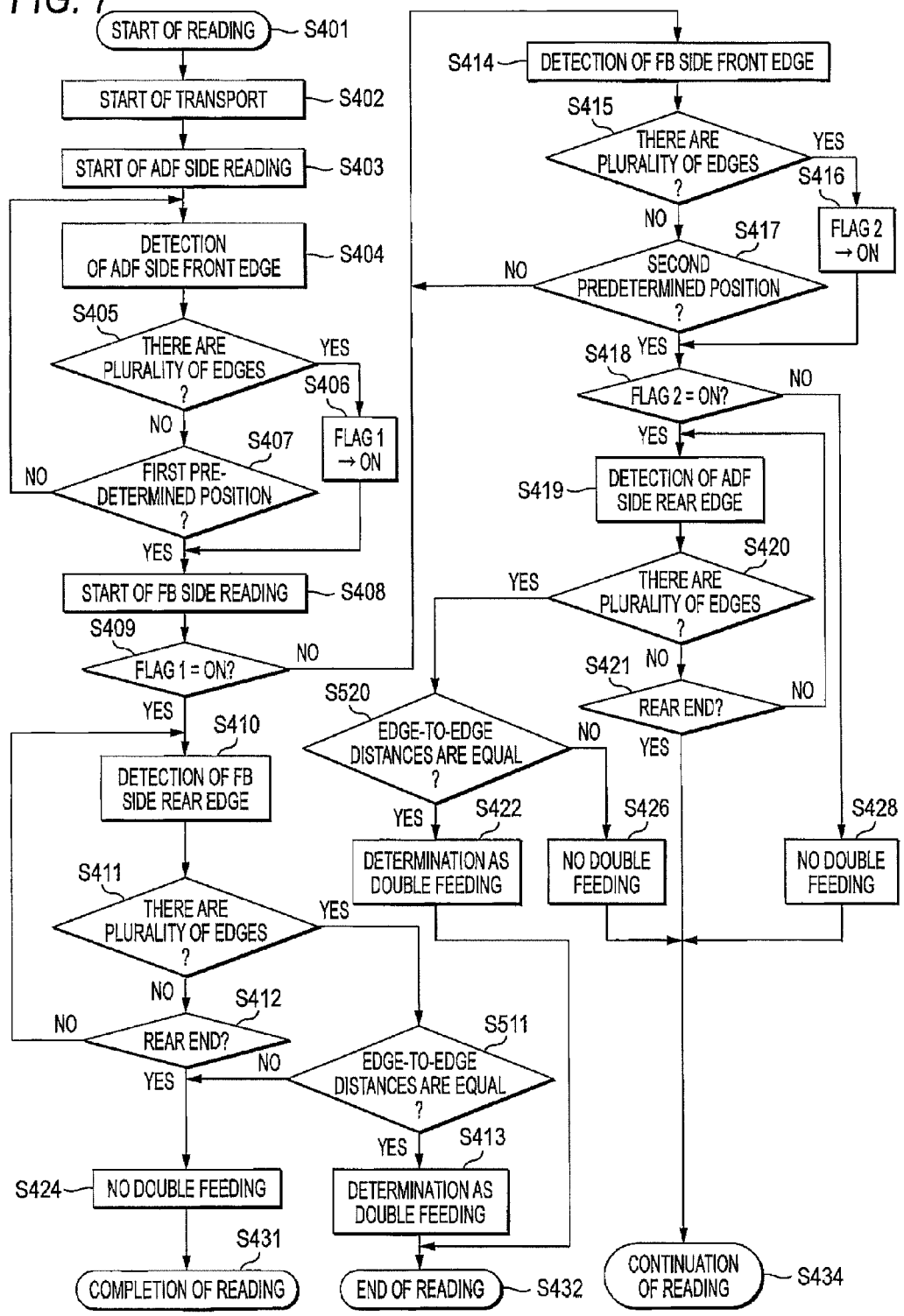
FIG. 7 is a flow chart showing processing of detecting double feeding of document in an image reading apparatus according to a third embodiment of the invention.

In the flow chart shown in FIG. 7, the same steps as in the flow chart shown in FIGS. 5 and 6 are denoted by the same reference numerals, and repeated explanation thereof will be omitted.

In step S411, when it is determined that data of a plurality of edges is stored in the edge data region 572 (step S411: YES), the process proceeds to step S511.

In step S511, a plurality of edge-to-edge distances stored in a region for back surface front ends of the edge data region 572 and a plurality of edge-to-edge distances stored in a region for top surface rear ends of the edge data region 572 are calculated.

When two edges are detected in a front end portion of the back surface of a document, the edge detected first is a front edge of the back surface of the document. In this case, a distance between the second edge and the front edge detected in the front end portion of the back surface of the document is calculated. Similarly, when two edges are detected in a rear end portion of the top surface of the document, the edge detected last is a rear edge of the top surface of the document. In this case, a distance between the first edge and the rear edge detected in the rear end portion of the top surface of the document is calculated.

Moreover, in the third embodiment, the distance between the second edge and the front edge detected in the front end portion of the back surface of the document and the distance between the first edge and the rear edge detected in the rear end portion of the top surface of the document are examples of "first edge-to-edge distance" and "second edge-to-edge distance" of the invention. The CPU 540 which performs processing of step S511 is an example of an "edge-to-edge distance acquisition unit" of the invention.

Then, in step S411, if a plurality of edges are detected (step S411: YES), the process proceeds to step S511. In step S511, the distance between two edges detected in the front end portion of the back surface of the document is compared with the distance between two edges detected in the rear end portion of the top surface of the document. If both the edge-to-edge distances are equal (step S511: YES), the process proceeds to step S413. If both the edge-to-edge distances are not equal (step S511: NO), the process proceeds to step S424.

If both the edge-to-edge distances are not equal (step S511: NO), it can be determined that something which is not an actual edge showing an end portion of a document is included in the detected edges since the edge-to-edge distance for the edges detected in the front end portion of the back surface of the document is different from the edge-to-edge distance for the edges detected in the rear end portion of the top surface of the document.

Then, in step S420, if a plurality of edges are detected (step S420: YES), the process proceeds to step S520. In step S520, a plurality of edge-to-edge distances stored in a region for top surface front ends of the edge data region 572 and a plurality of edge-to-edge distances stored in a region for back surface rear ends of the edge data region 572 are calculated.

When two edges are detected in a front end portion of the top surface of the document, the CPU 540 calculates a distance between the second edge and the front edge. On the other hand, when two edges are detected in a rear end portion of the back surface of the document, the CPU 540 calculates a distance between the first edge and the rear edge.

In addition, the distance between the second edge and the front edge detected in the front end portion of the top surface of the document and the distance between the first edge and the rear edge detected in the rear end portion of the back surface of the document are examples of "first edge-to-edge distance" and "second edge-to-edge distance" of the invention. The CPU 540 which performs processing of steps S511 and S520 is an example of an "edge-to-edge distance acquisition unit" of the invention.

In step S520, the distance between two edges detected in the front end portion of the top surface of the document is compared with the distance between two edges detected in the rear end portion of the back surface of the document. If both the distances are equal (step S520: YES), the process proceeds to step S422. If both the distances are not equal (step S520: NO), determination as no double feeding is made in step S426.

According to the present embodiment, when a plurality of edges are detected in two places of the front end portion of the top surface of the document and the rear end portion of the back surface of the document or in two places of the front end portion of the back surface of the document and the rear end portion of the top surface of the document, edge-to-edge distances in the two places are calculated and determination as double feeding is made when both the edge-to-edge distances are equal. In the case of double feeding of documents, since documents are transported in a state shifted by the same amount in the transport direction DF, both the edge-to-edge distances are equal. For this reason, since erroneous detection of double feeding caused by a long line across a document can be prevented more accurately, double feeding of documents can be detected correctly.

Fourth Embodiment

An image reading apparatus according to a fourth embodiment has the same hardware configuration as the image reading apparatus shown in FIGS. 1 and 2. In the fourth embodiment, however, edge-to-edge distances between the front edge or the rear edge of a document and other edges are calculated. Then, when any of the plurality of first edge-to-edge distances is equal to any of the plurality of second edge-to-edge distances and the number of matches is at least one, determination as double feeding is made. In the flow chart shown in FIG. 8, the same steps as in the flow chart shown in FIGS. 5 to 7 are denoted by the same reference numerals, and repeated explanation thereof will be omitted.

Figure 8:
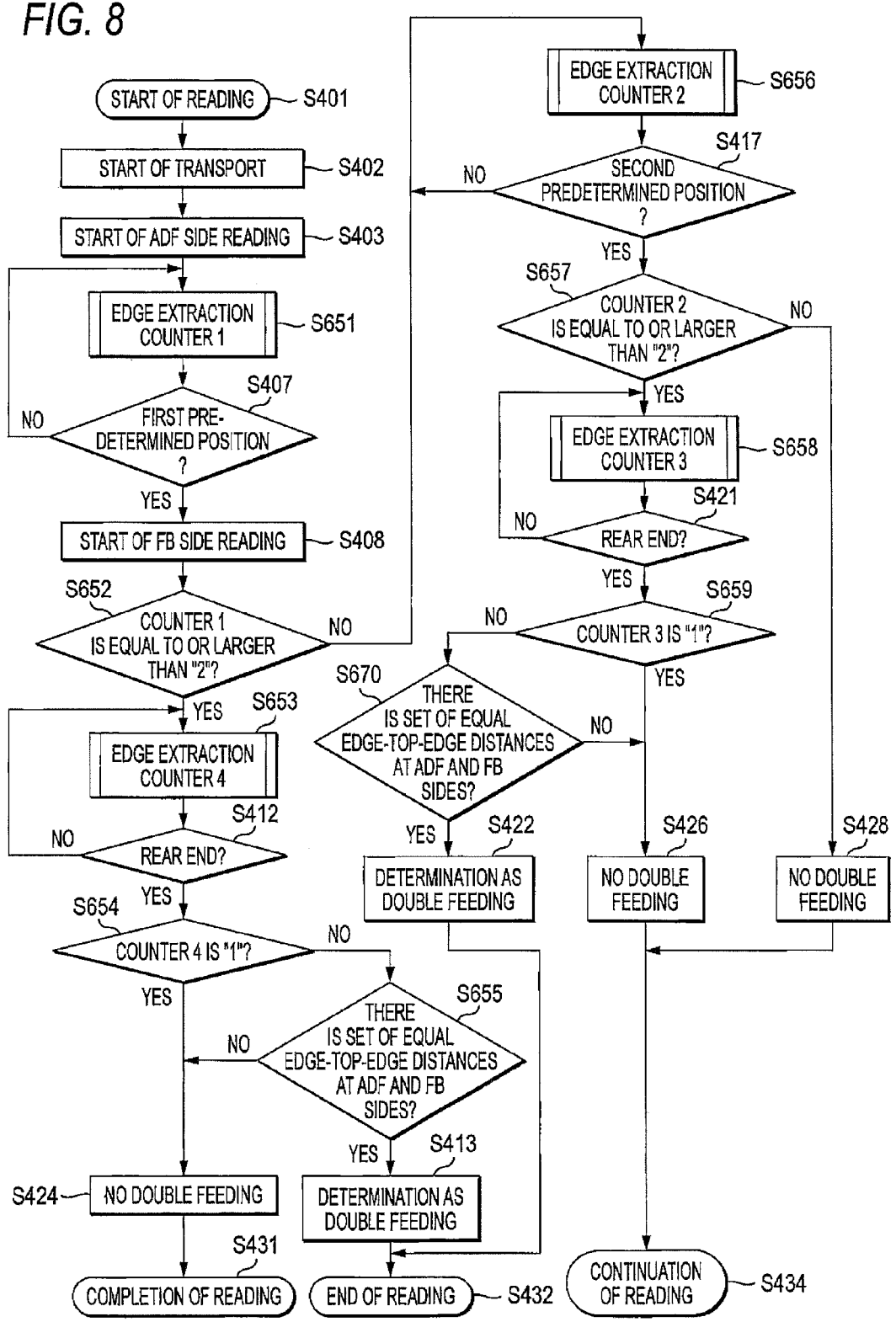
FIG. 8 is a flow chart showing processing of detecting double feeding of document in an image reading apparatus according to a fourth embodiment of the invention.
Figure 9:
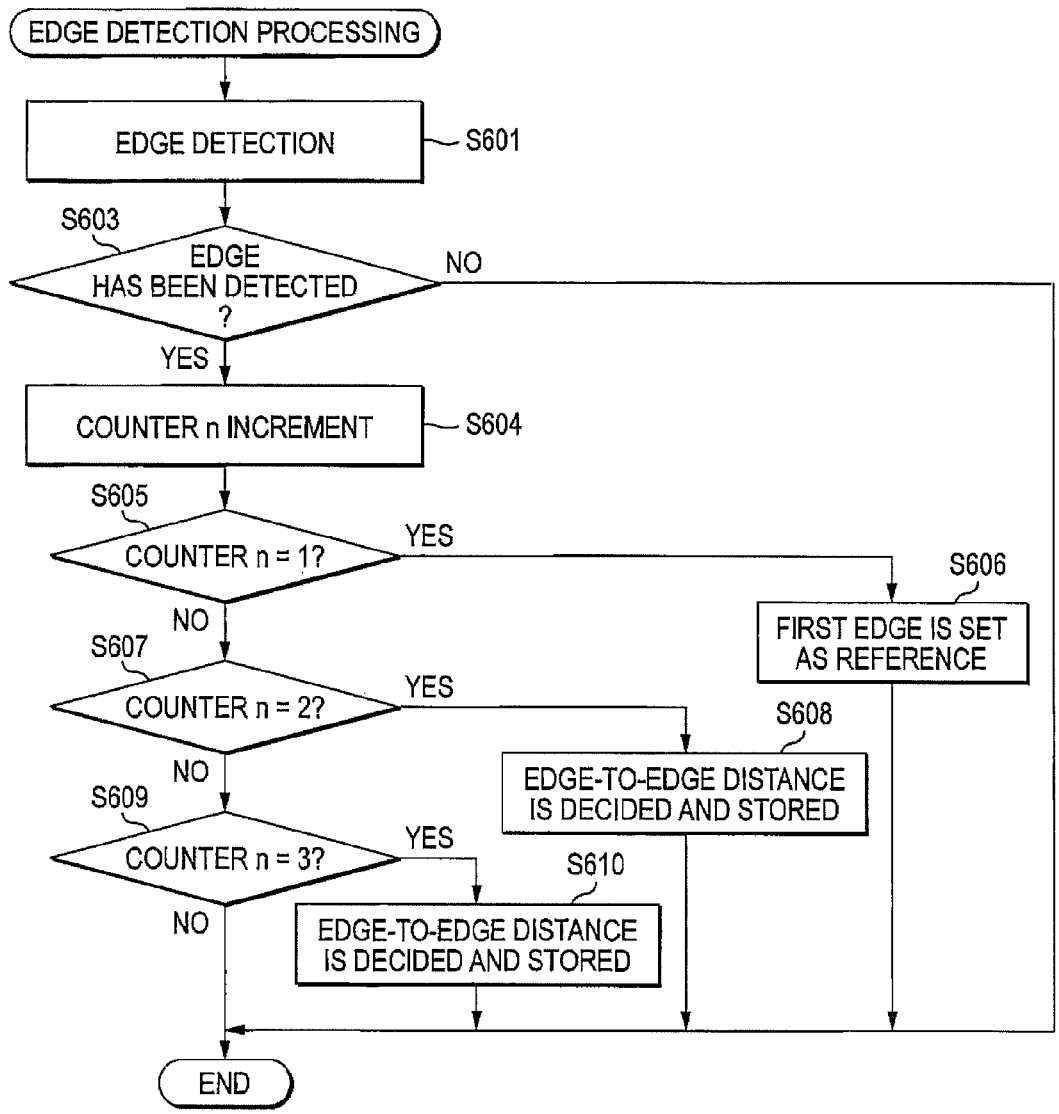
FIG. 9 is a flow chart showing edge detection processing in the fourth embodiment of the invention.

FIG. 9 shows edge detection processing in processing of steps S651, S653, S656, and S658 in FIG. 8. In addition, the processing of step S651 corresponds to a counter 1, the processing of step S653 corresponds to a counter 4, the processing of step S656 corresponds to a counter 2, and the processing of step S658 corresponds to a counter 3.

Moreover, in subsequent explanation, step S651 which is edge detection processing in a front end portion of the back surface of a document will be described as an example.

First, in step S601, an instruction to perform edge detection is given to the edge detection section 522. Then, the edge detection section 522 reads the image data of one line from the image data region 571 and performs the above-described edge detection processing. If the edge is detected, the edge data is stored in the edge data region 572 of the RAM 570.

In step S603, it is determined whether or not the edge data is stored in the edge data region 572. When it is determined that no edge has been detected and the edge data is not stored (step S603: NO), the processing shown in FIG. 9 ends. Then, the process proceeds to step S407 in FIG. 8.

When it is determined that an edge has been detected and the edge data is stored (step S603: YES), the CPU 540 increments the value of the counter 1 stored in the RAM 570 by 1 (step S604). In addition, the CPU 540 increments the value of the counter 4 by 1 in the case of step S653, increments the value of the counter 2 by 1 in the case of step S656, and increments the value of the counter 3 by 1 in the case of step S658.

In step S605, it is determined whether or not the value of the counter 1 stored in the RAM 570 is 1. If the value of the counter 1 is 1, the edge is an edge detected first. Then, in step S606, the edge detected first is set as a reference for calculating the distance.

In addition, if the value of the counter 1 is 1, the processing shown in FIG. 9 ends since the value of the counter 1 is not 2 (step S607: NO) and the value of the counter is not 3 (step S609: NO). Then, the process proceeds to step S407 in FIG. 8.

When a second edge is detected (step S603: YES) while the processing of steps S651 and S407 is repeated, the CPU 540 increments the value of the counter 1 stored in the RAM 570 by 1 and as a result, the value of the counter 1 becomes 2 (step S604).

If the value of the counter 1 is 2, an edge-to-edge distance between the edge detected first and the edge detected next is calculated from the edge data stored in the edge data region 572 of the RAM 570, and the calculated edge-to-edge distance is stored in the RAM 570 (step S608).

In addition, when a third edge is detected (step S603: YES) while the processing of steps S651 and S407 is repeated, the CPU 540 increments the value of the counter 1 stored in the RAM 570 by 1 and as a result, the value of the counter 1 becomes 3 (step S604).

If the value of the counter 1 is 3, an edge-to-edge distance between the edge detected first and the edge detected third is calculated from the edge data stored in the edge data region 572 of the RAM 570, and the calculated edge-to-edge distance is stored in the RAM 570 (step S610).

In the fourth embodiment, the CPU 540 and the edge detection sections 521 and 524 which perform edge detection processing according to step S651 and steps S653, S656, and S658, which will be described later, are an example of an "edge detection unit" of the invention, and the edge detection processing is an example of an "edge detection step" of the invention.

In step S652, it is determined whether or not the value of the counter 1 stored in the RAM 570 is equal to or larger than 2. If the value of the counter 1 is not equal to or larger than 2 (step S652: NO), that is, when the value of the counter 1 is 1, the process proceeds to step S656. On the other hand, if the value of the counter 1 is equal to or larger than 2 (step S652: YES), the process proceeds to step S653. In addition, "the value of the counter 1 is equal to or larger than 2" corresponds to "a plurality of edges have been detected".

In step S653, edge detection processing in the rear end portion of the top surface of the document is performed. Then, in step S654, it is determined whether or not the value of the counter 4 is 1. If the value of the counter 4 is not 1 (step S654: NO), the process proceeds to step S655. If the value of the counter 4 is 1, that is, if two or more edges are not detected in the rear end portion of the top surface of the document, the CPU 540 performs determination as no double feeding in step S424, and the process proceeds to step S431.

In step S655, it is determined whether or not any of the edge-to-edge distances stored in the RAM 570 by the processing of step S651 is equal to any of the edge-to-edge distances stored in the RAM 570 by the processing of step S653. If there is a set of equal edge-to-edge distances (step S655: YES), determination as double feeding is made in step S413. If there is no set of equal edge-to-edge distances (step S655: NO), determination as no double feeding is made in step S424.

Figure 10A:
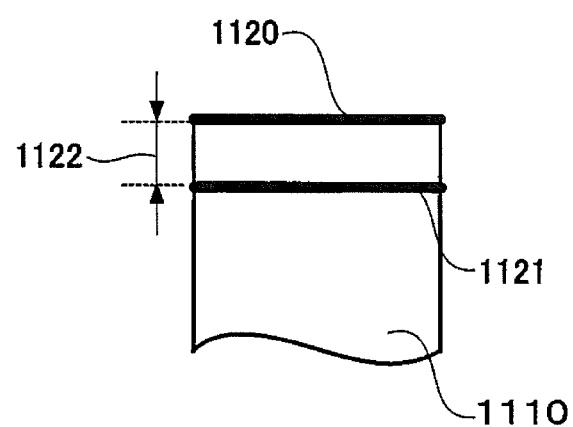
FIG. 10A is a view showing an example of the image data 1110 at the front end of the back surface after edge enhancement processing and binarization processing are performed by an edge detection section 522 in a state where documents are transported in an overlap state.

Step S655 will be described using specific examples shown in FIGS. 10A and 10B. FIG. 10A shows an example of the image data 1110 at the front end of the back surface after edge enhancement processing and binarization processing are performed by the edge detection section 522 in a state where documents are transported in an overlap state. In FIG. 10A, two documents are transported in an overlap state, and front ends of back surfaces of the two documents are expressed as edge data 1120 and 1121. In addition, an edge-to-edge distance 1122 between the edge data 1120 and 1121 is shown in FIG. 10A.

Figure 10B:
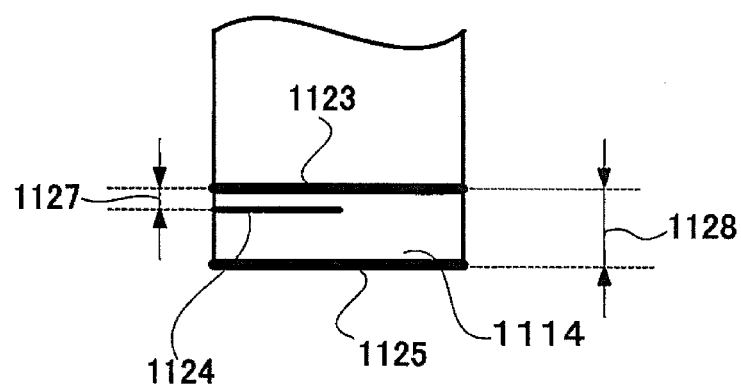
FIG. 10B is a view showing an example of the image data 1114 at the rear end of the top surface after edge enhancement processing and binarization processing are performed by an edge detection section 524 in a state where documents are transported in an overlap state and the long line drawn on the document is detected as edge data 1124.

In addition, in FIG. 10B, two documents are transported in an overlap state as in FIG. 10A, and rear ends of top surfaces of documents are expressed as edge data 1123 and 1125. In addition, in FIG. 10B, edge data 1124 when a long line drawn on the document is detected as an edge is expressed.

In the state shown in FIG. 10B, the edge-to-edge distance in step S608 becomes an edge-to-edge distance 1127, which is a distance between one rear edge 1123 of the top surface of the document and the edge data 1124 that is the long line drawn on the document, and the edge-to-edge distance in step S610 becomes an edge-to-edge distance 1128 between both the front ends of the two documents transported in an overlap state. In the states shown in FIGS. 10A and 10B, the edge-to-edge distance 1122 and the edge-to-edge distance 1127 are different. On the other hand, the edge-to-edge distance 1122 between both the front edges of the back surfaces of the two documents is equal to the edge-to-edge distance 1128 between both the rear edges of the top surfaces of the two documents.

Then, in step S655, it is determined that there is a set of equal edge-to-edge distances at the ADF side (front ends of the back surfaces of documents) and the FB side (rear ends of the top surfaces of documents). Then, the process proceeds to step S413.

In addition, if there are no equal edge-to-edge distances unlike the cases of the states shown in FIGS. 10A and 10B (step S655: NO), it can be determined that something which is not an actual end of the document is included in the three edges detected in the front end portions of the back surfaces of the documents and the three edges detected in the rear end portions of the top surfaces of the documents. Then, the process proceeds to step S424, and the reading is completed in step S431.

In step S656, edge detection processing in front end portions of the top surfaces of the documents is performed. Then, in step S657, it is determined whether or not the value of the counter 2 is equal to or larger than 2. In addition, "the value of the counter 1 is equal to or larger than 2" corresponds to "a plurality of edges have been detected".

In step S659, it is determined whether or not the value of the counter 3 is 1. If the value of the counter 3 is not 1 (step S659: NO), the process proceeds to step S670. If the value of the counter 3 is 1 (step S659: YES), the process proceeds to step S426.

In step S670, it is determined whether or not any of the edge-to-edge distances stored in the RAM 570 by the processing of step S656 is equal to any of the edge-to-edge distances stored in the RAM 570 by the processing of step S658. If there is a set of equal edge-to-edge distances (step S670: YES), determination as double feeding is made in step S422. If there is no set of equal edge-to-edge distances (step S670: NO), determination as no double feeding is made in step S426.

According to the present embodiment, the number of edges when calculating the edge-to-edge distance is two or more. Accordingly, the number of edges may also be three or four. By comparison of the edge-to-edge distances, double feeding can be correctly detected even if the long line across a document is drawn between the front edges or the rear edges of two documents transported in an overlap state, for example.

[Modifications]

(1) In the first to fourth embodiments, document transport is stopped according to the processing of step S432 and as a result, the document reading operation ends part way. In addition to the stopping of document transport or instead of this stopping, a message for notifying a user that double feeding has been detected may be displayed on a display panel provided in the image reading apparatus.

(2) In the first to fourth embodiments, the CPU 540 performs determination as double feeding when a plurality of edges are detected in the front end portion of the back surface of the document or when a plurality of edges are detected in both the front end portion of the back surface of the document and the rear end portion of the top surface of the document. However, a timing of determination of double feeding is not limited to the configuration of the present embodiment. For example, even when performing edge detection in a front end portion of a document, determination of double feeding may be performed after reading of the entire back surface and the entire top surface of the document ends.

(3) In the first embodiment, the CPU 540 performs determination as double feeding when a plurality of edges are detected in any of the front end portion of the back surface of the document, the rear end portion of the back surface of the document, the front end portion of the top surface of the document, and the rear end portion of the top surface of the document. However, the invention is not limited to the configuration in which a plurality of edges are detected in these four edge portions. For example, a plurality of edges may be detected only in two end portions located at the same side of top and back surfaces of a document. Specifically, when a front end portion of the back surface of a document is set as one end portion of one surface of the document and a front end portion of the top surface of the document is set as an end portion of the other surface of the document which is located at the same side as the one end portion of the one surface, determination as double feeding may also be made when a plurality of edges are detected in the front end portion of the back surface of the document or the front end portion of the top surface of the document. Alternatively, when a plurality of edges are detected in the rear end portion of the back surface of the document or the rear end portion of the top surface of the document, determination as double feeding may be made. If a configuration is adopted in which a plurality of edges are detected in the front end portion of the back surface of a document or the front end portion of the top surface of a document, determination of double feeding can be made early in the document transport operation.

What is claimed is:

1. An image reading apparatus comprising:
    a transport unit which transports a document placed on a paper feed tray to a paper discharge tray along a transport path;
    a first reading unit which reads one surface of the document transported by the transport unit and generates first read data of a front end portion or a rear end portion of the one surface of the document;
    a second reading unit which reads the other surface of the document transported by the transport unit and generates second read data of a front end portion or a rear end portion of the other surface of the document;
    an edge detection unit which performs enhancement processing and binarization processing on the first read data and the second read data and detects edges based on the processed first read data and the processed second read data; and
    a determination unit which determines that there is double feeding of documents by the transport unit when the edge detection unit detects a plurality of edges from at least either the processed first read data or the processed second read data,
    wherein the determination unit determines that there is double feeding of documents by the transport unit when the edge detection unit detects from the processed first read data a plurality of edges in one of the front end portion and the rear end portion of the one surface of the document and detects from the processed second read data a plurality of edges in the opposite end portion of the other surface of the document to the one end portion of the one surface of the document.

2. The image reading apparatus according to claim 1, wherein the determination unit determines that there is double feeding of documents by the transport unit when the edge detection unit detects from the processed first read data a plurality of edges in the front end portion of the one surface of the document and detects from the processed second read data a plurality of edges in the rear end portion of the other surface of the document.

3. The image reading apparatus according to claim 1, wherein the determination unit determines that there is double feeding of documents by the transport unit when the edge detection unit detects from the processed first read data a plurality of edges in the rear end portion of the one surface of the document and detects from the processed second read data a plurality of edges in the front end portion of the other surface of the document.

4. The image reading apparatus according to claim 1, wherein the determination unit includes an edge-to-edge distance acquisition unit which acquires a first edge-to-edge distance between an edge detected first or an edge detected last of a plurality of edges detected from the processed first read data and at least another one edge of the plurality of edges and a second edge-to-edge distance between an edge detected first or an edge detected last of a plurality of edges detected from the processed second read data and at least another one edge of the plurality of edges, and
    the determination unit determines that there is double feeding of documents by the transport unit when the first edge-to-edge distance and the second edge-to-edge distance are equal.

5. The image reading apparatus according to claim 1, wherein the determination unit includes an edge-to-edge distance acquisition unit which acquires a plurality of first edge-to-edge distances from an edge detected first or an edge detected last of a plurality of edges detected from the processed first read data to each of the plurality of edges and a plurality of second edge-to-edge distances from an edge detected first or an edge detected last of a plurality of edges detected from the processed second read data to each of the plurality of edges, and
    the determination unit determines that there is double feeding of documents by the transport unit when any one of the plurality of first edge-to-edge distances is equal to any one of the plurality of second edge-to-edge distances and the number of matches is at least one.

6. The image reading apparatus according to claim 1, wherein the determination unit determines that there is double feeding of documents by the transport unit when the edge detection unit detects from the processed first read data a plurality of edges in one of the front end portion and the rear end portion of the one surface of the document or detects from the processed second read data a plurality of edges in the end portion of the other surface of the document located at the same side as the one end portion of the one surface of the document.

7. The image reading apparatus according to claim 1, further comprising:
    a display unit which displays that there is double feeding of documents by the transport unit.

8. A computer readable storage device storing a program that, when executed by a computer, causes the computer to function as a first reading unit, a second reading unit, an edge detection unit and a determination unit when a document placed on a paper feed tray is transported to a paper discharge tray along a transport path, wherein
    the first reading unit that reads one surface of the document and generates first read data of a front end portion or a rear end portion of the one surface of the document;
    the second reading unit that reads the other surface of the document and generates second read data of a front end portion or a rear end portion of the other surface of the document;
    the edge detection unit performs enhancement processing and binarization processing on the first read data and the second read data and detects edges based on the processed first read data and the processed second read data; and
    the determination unit that determines that there is double feeding of documents when a plurality of edges are detected by the edge detection unit from at least either the processed first read data or the processed second read data, wherein the determination unit determines that there is double feeding of documents by the transport unit when the edge detection unit detects from the processed first read data a plurality of edges in one of the front end portion and the rear end portion of the one surface of the document and detects from the processed second read data a plurality of edges in the opposite end portion of the other surface of the document to the one end portion of the one surface of the document.

* * * * *